United States Patent Office 3,016,388
Patented Jan. 9, 1962

3,016,388
NEW ESTERS OF 19-NOR-TESTOSTERONE
Erik Duyvene de Wit, Oss, Netherlands, assignor to Organon Inc., West Orange, N.J., a corporation of New Jersey
No Drawing. Filed June 20, 1960, Ser. No. 37,085
Claims priority, application Netherlands June 30, 1959
3 Claims. (Cl. 260—397.4)

The invention relates to new esters of 19-nor-testosterone and a process for the preparation thereof.

More particularly it relates to esters of 19-nor-testosterone derived from organic acids having more than 18 carbon atoms.

These esters have an extraordinarily low androgenic action.

Said esters are less suitable for human use, because for that purpose a quickly acting compound is mostly needed, the action of which ceases after a certain time. For human use esters such as the known 19-nor-testosterone-β-phenylpropionate, which has lost its action after two weeks, will therefore in most cases be preferred to the present esters which may still be active half a year after injection. Yet there are syndromes in which such a sustained action is desired. Mention may be made here of osteoporose, diabetic retinopathy and obesity.

These esters are also of great importance for veterinary application. For example, by a single injection of one of these esters with young pigs, the protein formation may be very greatly intensified at the cost of the deposit of fat, through which in a shorter time meat of greater value is obtained.

A possible field of application of the present esters is perhaps the application as a prophylactic against the injurious effects of ionising radiation. For it has appeared that the injurious effects of such a radiation can be greatly reduced by treating persons undergoing a radiation beforehand with an anabolic agent. Thus, for example, the occurrence of Röntgen intoxication is reduced when the person to be examined is injected before the röntgenological treatment with an anabolically active substance.

From the above it appears that the verterinary application of the present esters is an important one. As an androgenic action even with high doses is not noticeable, the animals destined for slaughter may be injected a few weeks after their birth with a high dose of the present compounds (for example 2 mg. per kg.) without fear that in consequence of the androgenic action the meat assumes a nasty taste. It will be possible for example to inject pigs two months after their birth, after which slaughter takes place at the usual age of about 8 months. There is no need at all to be afraid of injurious effects of consuming meat of animals treated in this manner, because the quantities of the present compounds in the meat are so exceptionally low and they exert no injurious effect, even when brought into the human body by injection.

As examples of esters suitable for the esterification of 19-nor-testosterone according to the invention, are mentioned arachic acid, cluytic acid, behenic acid, erucic acid, lignoceric acid, cerotic acid, carboceric acid and montanic acid. Also acids having more carbon atoms are suitable for the present process, as well as acids having one or more double or triple bonds. Such acids less accessible, however, preference is given to the more accessible acids, for example, having not more than 30 carbon atoms, particularly arachic acid and behenic acid.

The present esters are prepared in the manner known per se for the formation of esters, for example, by reacting 19-nor-testosterone with the acid chloride or the anhydride of the relative acid. It is also possible to melt 19-nor-testosterone together with the relative acid and heat the mixture for some time. From the reaction mixture the ester is then isolated in any known manner.

The following examples illustrate the invention.

EXAMPLE I

19-nor-testosterone arachinate

In 20 ml. of dry pyridine 5 g. of 19-nor-testosterone are dissolved. The solution is cooled to 0° C. After that a solution of 8 g. of arachic acid chloride in 30 ml. of dry benzene is added with stirring.

The reaction mixture is kept at 0° C. for 16 hours and poured into ice water with stirring. The ester is taken up in benzene. The benzene solution is successively washed with water, 2 N sulphuric acid, water, a solution of 1 N sodium hydroxide, 2 N sulphuric acid and water until neutral. The solution is dried over sodium sulphate, filtered and evaporated to about 50 ml. and then filtered over 100 g. of neutral alumina. The yield of 19-nor-testosterone arachinate is substantially quantitative. Paper chromatography shows that the ester, which at room temperature is an oil, is pure.

$E_{240}$ m$\mu$=16,200 (in ethanol)
$[\alpha]_D$=+36° (in chloroform)

In the same manner the 19-nor-testosterone 17-esters derived from cerotic acid and lignoceric acid are prepared.

EXAMPLE II

19-nor-testosterone behenate

In the manner of Example I 19-nor-testosterone behenate is obtained starting from 10 g. of 19-nor-testosterone and 15 g. of behenic acid chloride. This substance, too, is an oil.

$E_{239}$ m$\mu$=15,900 (in ethanol)
$[\alpha]_D$=+34° (in chloroform)

EXAMPLE III

19-nor-testosterone erucic acid ester 5 g. of 19-nortestosterone and 10 g. of erucic acid chloride are esterified as in Example I at 0° C. The erucic acid ester of 19-nor-testosterone is obtained as an oil, the yield being substantially quantitative.

$E_{239}$ m$\mu$=16,100 (in ethanol)
$[\alpha]_D$=+35° (in chloroform)

In the same manner the 19-nor-testosterone-17-esters derived from montanic acid and carboceric acid are prepared.

I claim:
1. 19-nor-testosterone-17-ester of a hydrocarbon aliphatic carboxylic acid having 19–30 carbon atoms.
2. 19-nor-testosterone-17-behenate.
3. 19-nor-testosterone-17-arachinate.

References Cited in the file of this patent
UNITED STATES PATENTS

| | | |
|---|---|---|
| 2,308,834 | Ruzicka et al. | Jan. 19, 1943 |
| 2,831,873 | Pinson et al. | Apr. 22, 1958 |
| 2,868,809 | Donia et al. | Jan. 13, 1959 |

OTHER REFERENCES

Dorfman et al.: Androgens, John Wiley and Sons, Inc., New York (1956), pp. 512 and 513.